Aug. 25, 1936.  C. W. CHAMBERLAIN  2,052,014
HEAT TRANSFER METHOD AND APPARATUS
Filed Aug. 17, 1935
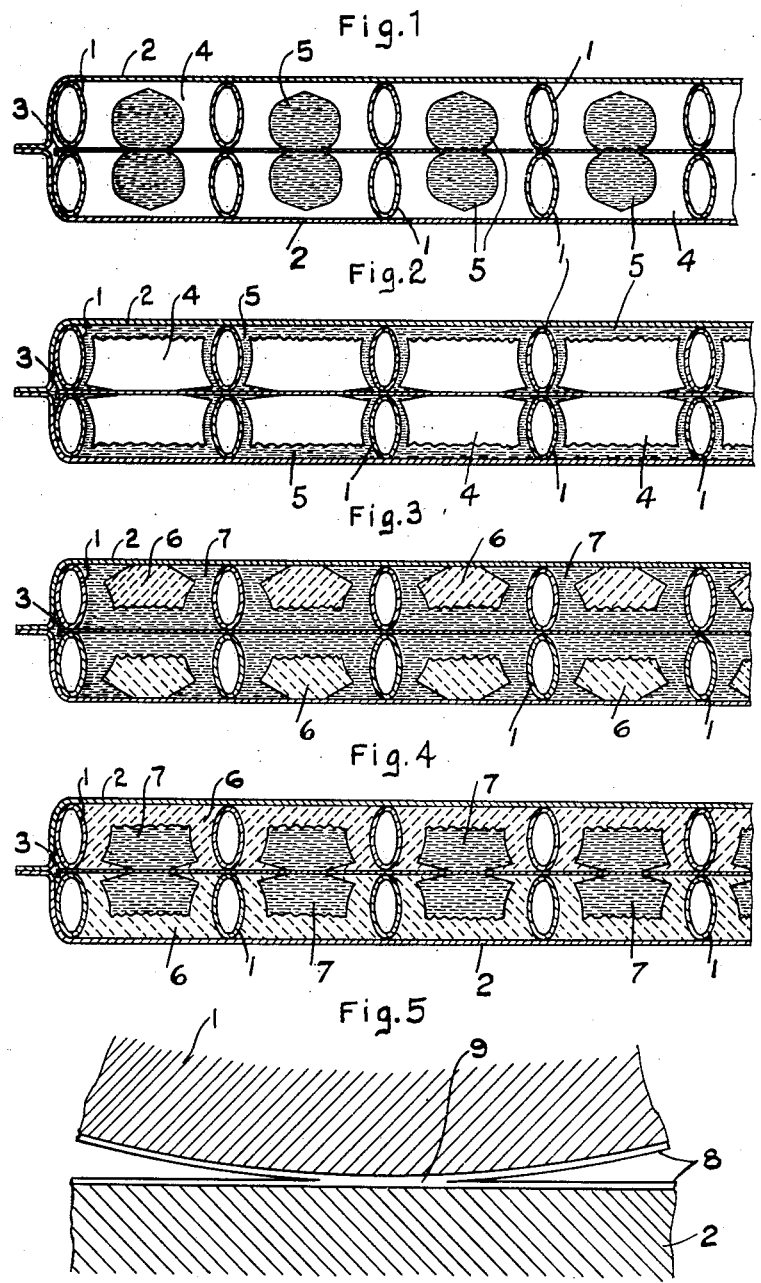
INVENTOR.
Clark W. Chamberlain
BY
Liverance & Van Antwerp
ATTORNEYS.

Patented Aug. 25, 1936

2,052,014

UNITED STATES PATENT OFFICE 2,052,014

HEAT TRANSFER METHOD AND APPARATUS

Clark W. Chamberlain, Lansing, Mich., assignor to Kold-Hold Manufacturing Company, Lansing, Mich., a corporation of Michigan Application August 17, 1935, Serial No. 36,680

17 Claims. (Cl. 251—1)

This invention relates to refrigeration and heating and more particularly is concerned with a process and apparatus for heat conveying in conjunction with refrigerating or heating units, the heat being conveyed from an interior space to be cooled to a medium which absorbs heat in changing from a solid to a liquid form. The heat conveying is also present in the same manner and operates on the same principle though in a reverse direction in the refrigerating of the refrigerating medium to change it from liquid to solid form, it being readily understood that in thus changing, the absorption of heat when it changes from solid to liquid is because of the latent heat of freezing of the medium; and conversely when the medium freezes and changes from liquid to solid there is given up a large amount of heat from the medium based upon the same latent heat.

The invention is also very useful in the matter of storing heat. The coils in such case will circulate a heating medium and surrounding the coils within the enclosing unit there will be material which has a high latent heat of fusion which, being melted by the heated medium circulating through the coils, stores a large amount of heat which is given off to the outside either to a room or other space in which it is located after the circulation has been stopped, the melted material around the coils solidifying and giving up its stored heat in the change from liquid to solid.

I have heretofore filed an application in the United States Patent Office, having Serial No. 707,623, filed January 2, 1935, which is directed to a cryogen which is the preferred medium to be used in an enclosed relatively flat containing unit, through which unit coils extend for carrying the refrigerant which is circulated by a compressor and cooled in a radiator in accordance with accepted methods of mechanical refrigeration operation.

In the present invention, one object thereof is to provide a novel process and apparatus wherein the heat transfer from the medium which is to be alternatively frozen and melted to the pipes carrying the refrigerating fluid and to the metal sides of the container is much improved, and the heat transfer from one to the other takes place upon a minimum temperature difference or gradient between the two.

Another object of my invention is to provide an improved structure which can be simply and economically produced to be used to store refrigeration, or, conversely, heat for the cooling or heating of an enclosed space in which it is installed which structure possesses maximum thermo-conductivity.

This transfer of heat either from the medium used to the refrigerating material, or reversely, occurs in all cases without the necessity of a large temperature gradient, and in fact with a minimum temperature difference due to the fact that the apparatus which I have devised is one having a maximum thermo-conductivity, and this without the necessity of soldering, welding or otherwise integrally connecting the heat conducting parts.

An understanding of the invention for the attainment of the objects stated may be had from the following description, taken in connection with the accompanying drawing, in which, Fig. 1 is a fragmentary sectional view of a refrigeration storage unit during the process of freezing the medium located therein through the extraction of heat therefrom which flows to the refrigerating material in the coils.

Fig. 2 is a similar sectional view during the process of melting the solidified solution or medium within the storage unit with a consequent absorption of heat from the exterior to cause such melting.

Fig. 3 is a sectional view of the heat storage unit during the process of charging or melting, heat being absorbed from the material flowing through the coils which is a circulating heating material to melt the medium housed within the unit around the coils.

Fig. 4 is a similar sectional view of the same heat storage unit during the process of discharging heat which flows from the liquid portion of the medium housed within the unit around the coils to the exterior of the storage unit, which in Figs. 3 and 4 is for heating, instead of refrigerating purposes, and Fig. 5 is a fragmentary, very much enlarged diagrammatic sectional view illustrating the films between the contacting portions of the coils and the adjacent metal members which enclose the refrigerating or heating unit.

Like reference characters refer to like parts in the different figures of the drawing.

In the construction of a refrigerating or heating unit a complete enclosure is made within which a conducting coil 1 is placed, the coils being of a nature similar to that illustrated in my pending application previously noted. Although no fins are shown it will be understood that fins might be used, their peripheries providing one of the contacting areas. The coil extends from one end to the other of the unit and has outlets preferably at opposite ends of the unit. In the present structure the coils are made of pipes or tubing preferably of an oval or elliptical cross section as indicated at 1, though they may be circular instead. These pipes are spaced apart as shown. The unit has sheet metal sides 2 which are bent inwardly toward each other at the sides and ends and welded together to make a completely tight enclosure, and in the illustration as shown, there is an intermediate plate of sheet metal, as indicated at 3, which lies between the two series of coils shown. It is, of course, to be understood that one series of coils only may be used between the opposite sides 2 of the unit, eliminating the intermediate plate 3, without in any respect departing from the present invention.

When the unit is used for refrigeration purposes a refrigerating fluid is circulated through the coils 1. The interior of the containing unit is partly filled with a suitable eutectic solution, a liquid having an appreciable vapor pressure at the temperatures of the containing unit and of the cryohydrate contained therein. The unit is preferably nearly filled with the cryohydrate eutectic solution but leaving some air. The air is then exhausted to a desired degree so that the pressure within the unit is less than atmospheric pressure outside whereby when the unit is sealed in such condition the pressure of the atmosphere at the outside causes the sides 2 to be pressed snugly against the adjacent portions of the coils 1, and such coils against plate 3.

This cryohydrate solution may be changed as to its physical form from a solid condition as, indicated at 4 in Figs. 1 and 2, to a liquid condition as shown at 5 in said Figs. 1 and 2. In all cases there is vapor present and in all cases a film of condensed vapor lies against all surfaces of metal within the unit, covering all surfaces of the pipe coils 1 and all surfaces of the intermediate sheet metal plate 3 and the inner surfaces of the sides 2 and the end portions shown.

This condensed vapor surface film is indicated at 8 in Fig. 5 in highly magnified form. It is not a film which is visible to the unaided eye nor can it be seen with the highest power microscope. I have provided an optical instrument of my own construction for the observation and determination and characteristics and properties of the film, and have found it to be six ten millionths of an inch thick, or not over five molecules thick. This film is very hard and when two of the films on two surfaces are brought together, as illustrated in Fig. 5, the two films under pressure partially coalesce, as indicated at 9, and form what is called the "wringing film". This wringing film 9 cannot be reduced in thickness under additional pressure no matter of what degree. Such films are very hard, having high compression strength and because of their extreme thinness and other physical characteristics possess a much higher coefficient of heat conductivity than the free liquid of which they are composed. Thus there is provided between the metal tubes of the refrigerating coils 1 and the metal members 2 and 3 of the refrigerating unit a direct thermal contact which in every way is one having capabilities of heat conduction approaching if not actually equaling the heat conduction of integral metal construction.

It will therefore be understood that by exhausting any amount of air from the sealed unit the excess pressure of the atmosphere at the outside produces the necessary pressure to cause the surface film 8 on the contacting surfaces to be pressed together and coalesce as at 9 to make the wringing films described, and produce the intimate thermal relation which has been described as following therefrom.

My invention utilizes the high heat conductivity of wringing films. The two pieces of metal indicated at 1 and 2 in Fig. 5 separated by a wringing film 9 are in substantially as good thermo-contact as if they were welded together. The surface films 9 from which the wringing films 9 are formed at the contact areas under pressure are produced by the presence in the containing unit of material possessing an appreciable vapor pressure at the temperature of the container. The wringing films 9 at the contact areas are formed from the surface films 8 by the excess of atmospheric pressure outside the containing unit over the combined pressure of the vapor and whatever residual air remains within the unit.

The amount of liquid or other material within the containing unit in no way controls the production of the surface film 8. The excess of external pressure over the internal pressure which produces the wringing films 9 likewise is in no sense dependent upon the amount of liquid or other material within the unit. If the containing unit is filled to 95% of its entire space with the material in either its liquid or solid form, the surface films and the wringing films are formed equally well as with any other quantity or amount of material contained. The formation of wringing films of a high thermo-conductivity in the presence of liquid and solid materials makes it possible to use in the containing units cryohydrates, eutectics or other materials useful for heating or refrigeration.

It is therefore apparent that there is utilized in equivalency the invention disclosed in the prior reissue Patent No. 18,826, upon the application of Elihu Thompson, and that the thermo-conducting fins are supplied by the outer plates 2 and the inner plates 3 which extend from the several pipes or tubes 1 of the refrigerating coil and are in direct intimate thermo-conducting relation thereto equivalent to all practical purposes to a welded connection of the same thereto, and thus obtaining all of the beneficial results which were produced by the Thompson invention.

In Fig. 1 there is illustrated a refrigeration storage unit nearly filled with cryohydrate as it appears during the process of freezing. Heat is conducted from the cryohydrate, in its liquid form, to the circulating refrigerating material in the tubes 1, not only directly thereto by the shortest path, but through the metal plates 2 and 3 by reason of the high conducting wringing films 9 between said plates and the metal tube 1. The cryohydrate is reduced to solid ice, as indicated at 4, first around the tubes and away therefrom along the plates 2 and 3, the last part of the liquid cryohydrate to be frozen being indicated at 5. Fig. 2 shows the refrigeration storage unit during the process of melting. It is to be understood that one or more of these units is placed within a containing space, such as in a refrigerating truck, car or in the room of a building, and that during the process of melting heat is extracted from said enclosed space, melting the ice 5 first at the sides 2 of the plates, and because of the thermo-conducting relation between the same and the tubes 1, the melting will take place around said tubes and away from said tubes along the surfaces of the interior plate 3 as shown in Fig. 3.

The thermal bond between the tubes and the fins provided by the plates 2 and 3 possesses very high conductivity as long as the excess of external pressure over internal pressure causes the plates 2 to be forced inwardly against the tubes, and consequently said tubes or pipes forced inwardly against the intermediate plate 3, thus producing and maintaining the wringing films 9 from the always present surface films 8.

As shown in Figs. 3 and 4 the apparatus and the process may be utilized so that the unit may be a heat storage unit instead of a refrigerating storage unit. In Fig. 3 heat is stored by circulating a heating instead of a refrigerating medium through the coils 1 to melt the solid material 6 to a liquid form as shown at 7, the melting following the same laws of conductivity of the heat from the tubes directly to the solid 6 and through the metal plates 2 and 6 in direct thermo-conducting relation therewith. In Fig. 4 the giving up of the heat of the containing unit to the outside is shown with the change of the liquid at 7 to solid form, as at 6, heat being given off to the outside so that the solid 6 forms first at the inner sides of the plates 2, around the tubes and away from the tubes in both directions alongside the sides of the intermediate plate 3.

In the illustration of the use of the apparatus as shown in Figs. 3 and 4 the material located within the enclosing unit, for example, may be a paraffin wax which has a high latent heat of fusion. There are many other ways or materials which are solid at atmospheric temperatures and which melt at a temperature, for example, equalling that of steam circulating through pipe coils. Such materials are odorless, non-poisonous and non-corrosive and are readily available for use in accordance with the described invention.

It is therefore apparent that, in some of its phases, my invention utilizes the placing within a closed container of a material or medium which at one temperature is solidified and at a higher temperature is liquid, such medium having an appreciable vapor pressure at the temperatures at which the apparatus is used. The container is not entirely filled but enough space is left with air then so that the air can be exhausted to reduce the pressure within the container below that of the outside atmosphere, thus providing the necessary force against the outer sides of the containing unit to provide the pressure required for producing the wringing films 9 described from the surface films 8 which are always present under such conditions. There is thus provided a structure wherein there is a maximum thermoconductivity through the metal parts used and this conductivity will occur even though there be but slight differences of temperature between the heat storing medium contained and the enclosed space to be refrigerated or, conversely, heated, as the case may be.

Having thus fully described my invention, what I desire to secure by Letters Patent is:

I claim:

1. The method of heat transfer from one member to another which consists in pressing the members toward each other in the presence of a liquid which forms a surface film on each of said members, said surface films being compressed between the members, as specified.

2. The method of securing heat transfer from one metallic member to another not in direct contact with each other which consists in placing said members in the presence of a liquid having a vapor pressure whereby a film of condensed vapor collects on the surfaces of said metallic members and between the same, and forcing said metallic members toward each other to coalesce the surface films between the same, as specified.

3. The method of heat transfer from one member to a second member which consists of enclosing one of the members within the other, partially filling the enclosure member with a liquid having a vapor pressure, and exhausting air to reduce the pressure within the enclosure member below that of atmospheric pressure whereby the sides of said enclosing member are pressed toward and against the other member thereby bringing surface films of condensed vapor on the adjacent contacting surface of said members together to form an intimate heat transfer bond between the same.

4. The method of producing and maintaining thin films of high thermal conductivity between two members not in actual contact which consists in providing one member in the form of an enclosure, locating the other member within said enclosure between the sides thereof so as to substantially bridge the distance between said sides, partly filling the enclosure with a liquid having a vapor pressure under the conditions of use thereof, and exhausting air from the enclosure and sealing the same to thereby decrease the pressure within said enclosure below that of atmospheric pressure whereby the sides of said enclosing member are pressed toward the second member within the same causing films of condensed vapor at the adjacent surfaces of said members to be coalesced together, as and for the purposes specified.

5. A refrigerating unit comprising a metal container having opposed flat sides, a refrigerating coil located within said container, the pipes of said coil extending between opposite sides of the container, said container having a cryohydrate therein which has an appreciable vapor pressure under the temperatures at which the refrigerating unit is used, said container and the cryohydrate therein being at a less pressure than the pressure of surrounding atmosphere whereby atmospheric pressure forces the side of the container inwardly toward the pipes or tubes of said coil, substantially as and for the purposes described.

6. The herein described method, consisting of providing an enclosing container having opposed sides and with a coil located within said container between said opposed sides and substantially bridging across between said sides, filling said container partly with a liquid having an appreciable vapor pressure under the temperature conditions at which used, and removing air from the container to reduce the pressure therein below atmospheric pressure, as specified.

7. The method of transferring heat from one metallic member to a second metallic member not in metallic contact with the first member which consists, in compressing films of condensed vapor on the adjacent and substantially contacting surfaces of said members, as specified.

8. The method of heat transfer from one metallic member to another which consists in pressing the members toward each other, said members being coated with a condensed vapor surface film, whereby said surface films are compressed between the members, as specified.

9. The method of providing a heat transfer structure which consists in providing an enclosing member partially filling said member with a liquid having a vapor pressure located within said member, a second member which extends between opposed walls of the first member and exhausting air to reduce the pressure within the enclosing member below atmospheric pressure, whereby air pressure from the outside forces the sides of the enclosing member inwardly, as and for the purposes specified.

10. The process of producing a wringing film which consists in bringing two surfaces, having liquid films thereon, together under pressure.

11. The process of producing a wringing film from a medium which is capable of changing from solid to liquid phase which consists in providing a first surface having said medium thereagainst, then forcing a second surface, likewise having said medium thereagainst, against the first surface, one of the said surfaces being restricted to a predetermined degree whereby unit pressure is increased as desired.

12. The method of producing and maintaining thin films of high thermal conductivity between two members not in actual contact by the utilization of pressure.

13. The method of transferring heat from one member to a second member not in actual contact with the first member by placing between the two members a thin film whose thickness is approximately two times the radius of molecular attraction.

14. The method of transferring heat from one metallic member to a second metallic member not in metallic contact with the first member by placing between the metal members a film of condensed vapor whose thickness is approximately one and two-tenths of a millionth of an inch.

15. The method of transferring heat from one metallic member to a second metallic member not in metallic contact with the first member by placing between the metal members a thin liquid film.

16. The method of forming a thermal conductor of high efficiency which consists in compressing two liquid barrier films together under a predetermined pressure to form a "wringing film".

17. A unit of the class described comprising a container having a heat carrying medium therein and a second container having a cryohydrate or the like therein, portions of said containers being in forcible contact, said portions being separated by a "wringing" film for the purpose described.

CLARK W. CHAMBERLAIN.